US012617291B2

(12) United States Patent
Theodosakis et al.

(10) Patent No.: US 12,617,291 B2
(45) Date of Patent: May 5, 2026

(54) BATTERY SYSTEM WAKEUP BASED ON VEHICLE MOTION

(71) Applicant: Textron Inc., Providence, RI (US)

(72) Inventors: Gregory August Theodosakis, Martinez, GA (US); Russell William King, Evans, GA (US); Jonathan Daniel Bowen, North Augusta, SC (US)

(73) Assignee: TEXTRON INC., Providence, RI (US)

( * ) Notice: Subject to any disclaimer, the term of this patent is extended or adjusted under 35 U.S.C. 154(b) by 46 days.

(21) Appl. No.: 18/776,815

(22) Filed: Jul. 18, 2024

(65) Prior Publication Data

US 2026/0021711 A1     Jan. 22, 2026

(51) Int. Cl.
| | |
|---|---|
| B60L 15/20 | (2006.01) |
| B60L 58/10 | (2019.01) |
| G07C 5/00 | (2006.01) |

(52) U.S. Cl.
CPC ........... B60L 15/2009 (2013.01); B60L 58/10 (2019.02); G07C 5/008 (2013.01)

(58) Field of Classification Search
CPC ...... B60L 15/2009; B60L 58/10; G07C 5/008
See application file for complete search history.

(56) References Cited

U.S. PATENT DOCUMENTS

| | | | | |
|---|---|---|---|---|
| 5,350,982 | A | * | 9/1994 | Seib .......................... B62B 3/12 |
| | | | | 318/431 |
| 5,524,081 | A | * | 6/1996 | Paul ........................ G01S 19/41 |
| | | | | 701/469 |

| | | | | |
|---|---|---|---|---|
| 5,565,760 | A | * | 10/1996 | Ball ......................... B60L 50/52 |
| | | | | 322/23 |
| 5,719,555 | A | * | 2/1998 | Zeytoonjian ........... A63B 55/61 |
| | | | | 340/988 |
| 6,470,242 | B1 | * | 10/2002 | Rudow ................... A63B 55/61 |
| | | | | 701/1 |
| 8,532,915 | B2 | | 9/2013 | Kim et al. |
| 9,008,890 | B1 | * | 4/2015 | Herbach .............. G05D 1/0297 |
| | | | | 340/436 |
| 9,043,041 | B2 | | 5/2015 | Willis et al. |
| 9,060,213 | B2 | | 6/2015 | Jones |
| 9,168,885 | B2 | | 10/2015 | Weinberg |
| 9,593,521 | B2 | * | 3/2017 | Breed ................... B60R 16/037 |
| 9,750,977 | B2 | | 9/2017 | Yuen et al. |
| 9,828,965 | B2 | | 11/2017 | Ghoneim |
| 9,969,343 | B2 | | 5/2018 | Trapp et al. |

(Continued)

*Primary Examiner* — Gertrude Arthur Jeanglaude
(74) *Attorney, Agent, or Firm* — Foley & Lardner LLP

(57) ABSTRACT

A golf cart includes an electric motor configured to perform a braking function, a battery, a sensor, and a control system including a first controller and a second controller. The first controller and the sensor are powered by the battery without the second controller and the electric motor being powered during the low power state. The sensor is configured to facilitate detecting movement of the golf cart during the low power state. The first controller is configured to receive a signal from the sensor indicating that the golf cart has moved during the low power state and cause power from the battery to be provided to the second controller. The second controller is configured to separately evaluate the movement of the golf cart independent from the sensor and engage the electric motor to perform the braking function in response to determining that the golf cart is moving.

20 Claims, 8 Drawing Sheets

(56)        References Cited

U.S. PATENT DOCUMENTS

| | | | |
|---|---|---|---|
| 10,017,201 B2* | 7/2018 | Cardano | ............. B62D 5/046 |
| 10,093,197 B2 | 10/2018 | Deljevic et al. | |
| 10,094,669 B2 | 10/2018 | Haley et al. | |
| 10,099,562 B2 | 10/2018 | Jin et al. | |
| 10,124,693 B2 | 11/2018 | Seo et al. | |
| 10,263,447 B2 | 4/2019 | Mirtabatabaei et al. | |
| 10,300,806 B2 | 5/2019 | Paik et al. | |
| 10,358,043 B2* | 7/2019 | Dao | ......................... B60L 58/15 |
| 10,378,919 B2 | 8/2019 | Decia et al. | |
| 10,429,408 B2 | 10/2019 | Greer | |
| 10,444,018 B2 | 10/2019 | Miller | |
| 10,622,682 B2 | 4/2020 | Brockman et al. | |
| 10,852,165 B1 | 12/2020 | Davis et al. | |
| 10,933,755 B2 | 3/2021 | Harvey et al. | |
| 11,210,872 B1 | 12/2021 | Wong et al. | |
| 11,378,626 B2 | 7/2022 | Baek et al. | |
| 11,396,246 B2 | 7/2022 | Oestreich et al. | |
| 11,448,661 B2 | 9/2022 | Mac et al. | |
| 11,472,361 B2 | 10/2022 | Jenkins et al. | |
| 11,496,877 B1 | 11/2022 | Chen | |
| 11,515,578 B2 | 11/2022 | Lee et al. | |
| 11,522,235 B1 | 12/2022 | Fox et al. | |
| 11,577,739 B1 | 2/2023 | Walli et al. | |
| 11,625,960 B2 | 4/2023 | Delong et al. | |
| 11,745,700 B2 | 9/2023 | Rocroi et al. | |
| 11,772,513 B1 | 10/2023 | Janson et al. | |
| 2002/0188387 A1 | 12/2002 | Woestman et al. | |
| 2003/0158638 A1* | 8/2003 | Yakes | .................... G07C 5/008 |
| | | | 180/65.245 |
| 2005/0068039 A1 | 3/2005 | Bertness | |
| 2006/0220809 A1* | 10/2006 | Stigall | ..................... G08G 1/20 |
| | | | 340/5.31 |
| 2008/0249680 A1 | 10/2008 | Dwyer et al. | |
| 2008/0255795 A1 | 10/2008 | Shkolnikov | |
| 2008/0319606 A1 | 12/2008 | Fortson et al. | |
| 2009/0038864 A1* | 2/2009 | Yun | ......................... B62B 3/12 |
| | | | 180/19.1 |
| 2011/0202225 A1 | 8/2011 | Willis et al. | |
| 2012/0016544 A1 | 1/2012 | Pariseau et al. | |
| 2012/0016609 A1 | 1/2012 | Bertness | |
| 2012/0203488 A1 | 8/2012 | Dusha | |
| 2013/0295419 A1 | 11/2013 | Kwon et al. | |
| 2015/0105948 A1 | 4/2015 | Chang et al. | |
| 2015/0143932 A1 | 5/2015 | Ryker et al. | |
| 2015/0149007 A1 | 5/2015 | Kim et al. | |

| | | |
|---|---|---|
| 2015/0192416 A1 | 7/2015 | Nasiri et al. |
| 2015/0318723 A1 | 11/2015 | Brockman |
| 2017/0001536 A1 | 1/2017 | Seo et al. |
| 2017/0088072 A1 | 3/2017 | Curtis et al. |
| 2017/0190261 A1 | 7/2017 | Cheng |
| 2018/0005091 A1 | 1/2018 | Abe |
| 2018/0065577 A1 | 3/2018 | Lee |
| 2018/0301913 A1 | 10/2018 | Irish et al. |
| 2018/0315987 A1 | 11/2018 | Friedrich |
| 2019/0027791 A1 | 1/2019 | Begliarov et al. |
| 2019/0260090 A1 | 8/2019 | Herrema et al. |
| 2019/0315232 A1 | 10/2019 | Ing et al. |
| 2020/0014223 A1 | 1/2020 | Patel |
| 2020/0025829 A1 | 1/2020 | Jeon |
| 2020/0247463 A1 | 8/2020 | Kim et al. |
| 2021/0206288 A1 | 7/2021 | Ing |
| 2021/0241589 A1 | 8/2021 | Ramos et al. |
| 2022/0001769 A1 | 1/2022 | Huh |
| 2022/0041186 A1 | 2/2022 | Michel |
| 2022/0049665 A1 | 2/2022 | Khajepour et al. |
| 2022/0118879 A1 | 4/2022 | Wang et al. |
| 2022/0155333 A1 | 5/2022 | Trinkle et al. |
| 2022/0200070 A1 | 6/2022 | Gonring |
| 2022/0227231 A1 | 7/2022 | Husain |
| 2022/0295399 A1 | 9/2022 | Lee et al. |
| 2022/0297563 A1 | 9/2022 | Jo et al. |
| 2022/0324399 A1 | 10/2022 | Chen et al. |
| 2022/0355670 A1 | 11/2022 | Yang et al. |
| 2022/0381572 A1 | 12/2022 | Pidgeon et al. |
| 2022/0388397 A1 | 12/2022 | Wong et al. |
| 2022/0393259 A1 | 12/2022 | Fox et al. |
| 2023/0003862 A1 | 1/2023 | Hozumi et al. |
| 2023/0110042 A1 | 4/2023 | Yamamoto et al. |
| 2023/0138942 A1 | 5/2023 | Churchill |
| 2023/0144484 A1 | 5/2023 | Pourabdollah et al. |
| 2023/0198030 A1 | 6/2023 | Sung et al. |
| 2023/0205300 A1 | 6/2023 | Cooper et al. |
| 2023/0211751 A1 | 7/2023 | Hossain |
| 2023/0234698 A1 | 7/2023 | Schreiber et al. |
| 2023/0322170 A1 | 10/2023 | Jain et al. |
| 2023/0339344 A1 | 10/2023 | Chon |
| 2023/0347777 A1 | 11/2023 | Shpati et al. |
| 2023/0365025 A1 | 11/2023 | Cao |
| 2023/0399000 A1 | 12/2023 | Dingli et al. |
| 2024/0014673 A1 | 1/2024 | Jayaraj et al. |
| 2024/0030727 A1 | 1/2024 | Choi et al. |
| 2024/0039059 A1 | 2/2024 | Nam et al. |

* cited by examiner

600

602

Enter a low power state

604

Activate an occupancy sensor

606

Detect ingress of an occupant via the occupancy sensor

608

Initiate occupant ingress wakeup procedure

610

Power vehicle components

BATTERY SYSTEM WAKEUP BASED ON VEHICLE MOTION

BACKGROUND

The present application relates generally to a control system for a vehicle. More specifically, the present application relates to a power system for a golf cart.

SUMMARY

One embodiment relates to a golf cart operable in a low power state. The golf cart includes an electric motor configured to perform a braking function, a battery, a sensor, and a control system including a first controller and a second controller. The first controller and the sensor are powered by the battery without the second controller and the electric motor being powered during the low power state. The sensor is configured to facilitate detecting movement of the golf cart during the low power state. The first controller is configured to receive a signal from the sensor indicating that the golf cart has moved during the low power state, and cause power from the battery to be provided to the second controller in response to receiving the signal. The second controller is configured to separately evaluate the movement of the golf cart independent from the sensor, engage the braking function in response to determining that the golf cart is moving, and re-enter the low power state in response to determining that the golf cart is not moving.

Another embodiment relates to a vehicle operable in a low power state. The vehicle includes an electric motor configured to perform a braking function, a control system including a motor controller and a battery management system having an integrated inertial measurement unit, a user interface, and a battery. The battery management system and the integrated inertial measurement unit are powered by the battery without the motor controller and the electric motor being powered during the low power state. The integrated inertial measurement unit is configured to facilitate detecting movement of the vehicle during the low power state. The battery management system is configured to receive a signal from the integrated inertial measurement unit indicating that the golf cart has moved during the low power state, and cause power from the battery to be provided to the motor controller in response to receiving the signal. The motor controller is configured to separately evaluate the movement of the vehicle, re-enter the low power state in response to determining that the vehicle is not moving, enable the braking function in response to determining that the vehicle is moving, and operate the user interface to display a graphical user interface requesting that at least one (a) a physical key for the vehicle be inserted into an ignition, (b) the physical key be brought within a certain proximity of the vehicle, or (c) a credential be provided.

Still another embodiment relates to a method. The method includes providing a vehicle including an electric motor configured to perform a braking function, a battery, a sensor, and a control system including a first controller and a second controller; operating the battery in a low power state, which includes providing power to the first controller and the sensor without providing power to the second controller and the electric motor; receiving, by the first controller, a signal from the sensor indicating that the golf cart has moved during the low power state; causing, by the first controller, power from the battery to be provided to the second controller in response to receiving the signal; separately evaluating, by the second controller, the movement of the golf cart; enabling, by the second controller, the braking function in response to determining that the golf cart is moving; and re-entering the low power state in response to the second controller determining that the golf cart is not moving.

DETAILED DESCRIPTION

Figure 1:
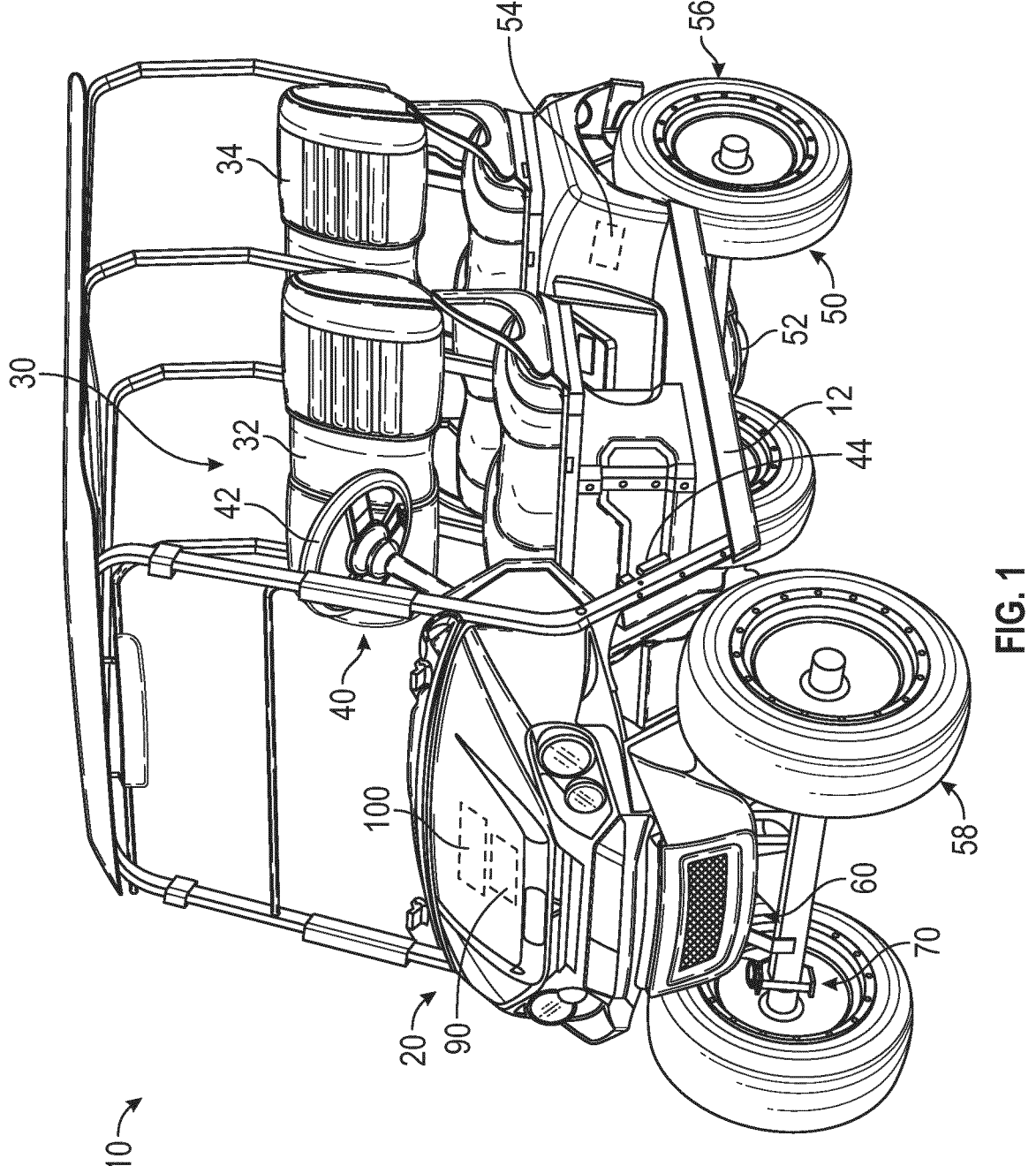
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes a battery management system ("BMS") controller that is configured to control power from a battery to the electrical components of the vehicle in a low power state. In exemplary embodiments, the BMS controller includes an inertial measurement unit ("IMU") for detecting various movement and vibrations in or by the vehicle. In the low power state, the BMS controller, and the IMU thereon, remains powered by the battery, whereas the remaining electrical components are powered off (e.g., a vehicle controller, operator controls, a driveline and prime mover, etc.). Responsive to the IMU detecting motion indicating that an occupant has entered the vehicle, the BMS controller may transmit power from the battery to wake up the one or more electrical components of the vehicle. Advantageously, this wakeup process upon occupant ingress causes the electrical initialization process to begin before the occupant presents a key, pushes a button, or operates a switch to turn the vehicle on.

Responsive to the IMU detecting motion indicating the vehicle is moving (e.g., rolling) in the low power state, the BMS controller may transmit power from the battery to wake up the one or more electrical components of the vehicle, including an overall vehicle controller and/or a motor controller. The motor controller may enable walkaway braking. Walkaway braking may include operating an electric motor to engage in regenerative braking and/or a parking brake to stop or slow the undesired movement of the vehicle. In such an example, the motor controller causes the electric motor to operate as a generator that converts the kinetic energy produced by the wheels/driveshaft of the vehicle during unwanted movement into electricity and creates a resistive force that opposes the motion of the vehicle. In some embodiments, the vehicle controller may require an operator to enter a PIN or present a key before the motor controller disables walkaway braking. Additionally, the vehicle controller may transmit a reporting signal to an offsite remote computing system regarding the vehicle's movement in the low power state. In some embodiments, the vehicle controller may sound an alarm responsive to an operator entering an incorrect PIN. Advantageously, the wakeup process upon movement in the low power state allows the vehicle to stop unwanted movement. For example, operating the enabling walkaway braking may stop a vehicle from travelling down a hill. In another example, enabling walkaway braking may prevent the vehicle from being push start. Advantageously, this serves as an unintentional movement mechanism and/or an anti-theft mechanism.

Overall Vehicle

Figure 2:
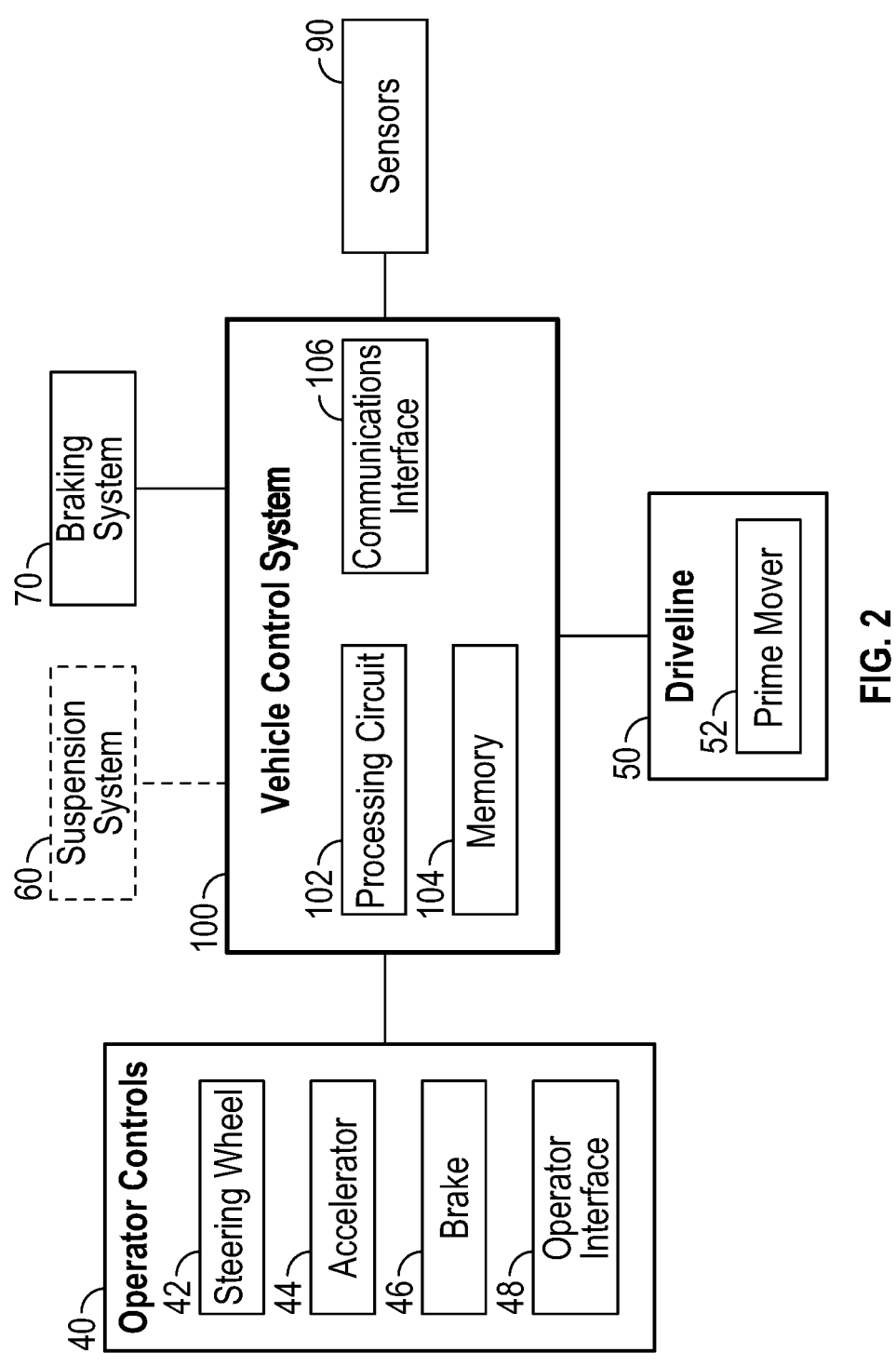
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, electromagnetic brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, the braking system 70 includes an electromagnetic parking brake. The electromagnetic parking brake may include an electromagnetic coil and a plate or armature. When the parking brake is disengaged, electrical current flows from the battery of the vehicle 10 to the parking brake. This creates a magnetic field in the electromagnetic coil, which, in turn, induces a magnetic force that attracts the plate or armature to the electromagnetic coil. The movement of the plate or armature towards the electromagnetic coil physically disengages mechanical brake mechanisms (e.g., brake pads or discs).

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Site Monitoring and Control System

Figure 3:
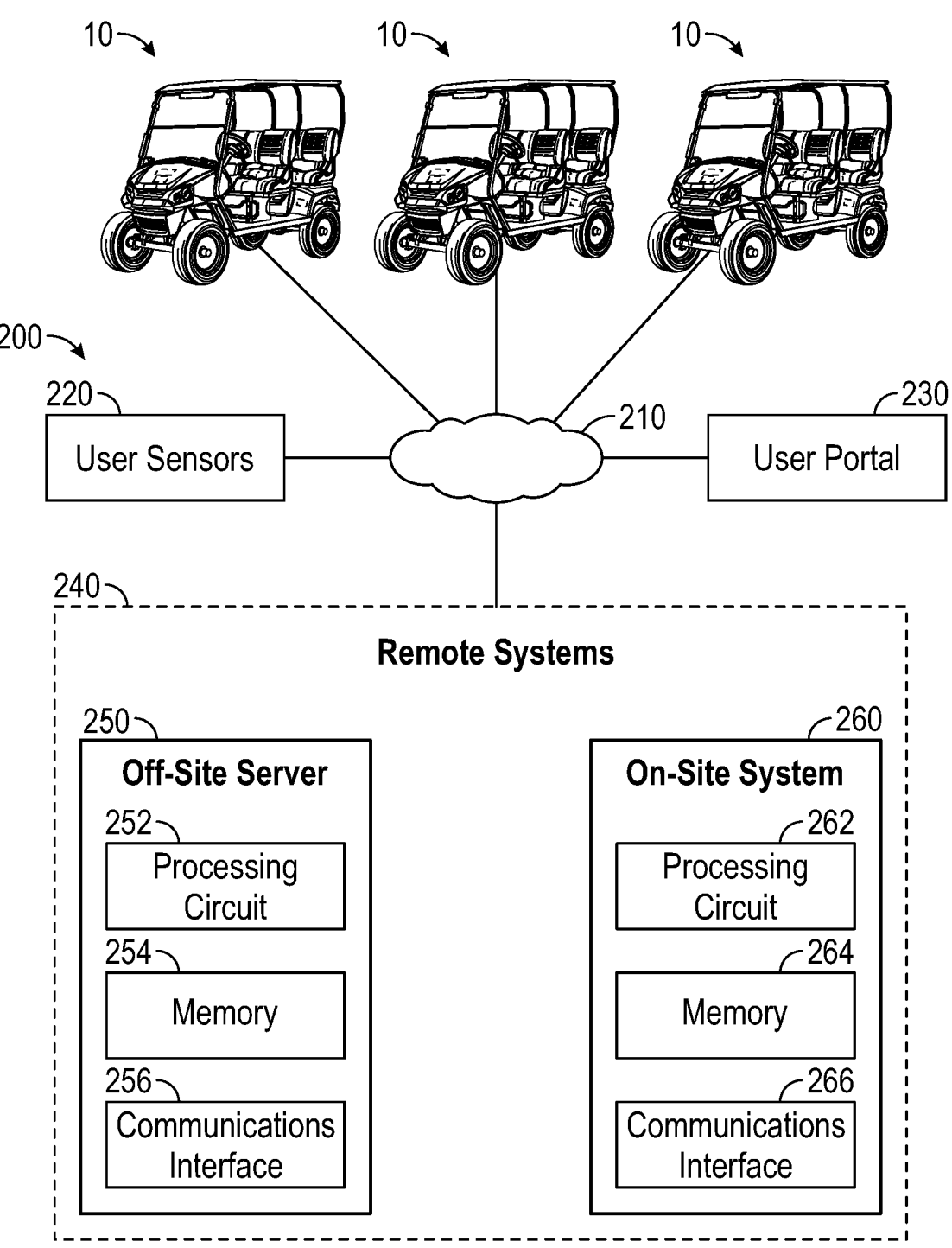
FIG. 3 is a schematic block diagram of a site monitoring and control system including a plurality of the vehicles of FIG. 1, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons breaking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). The user portal 230 may be or may be accessed via a computer, laptop, smartphone, tablet, or the like.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle controllers 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Vehicle Wakeup

Figure 4:
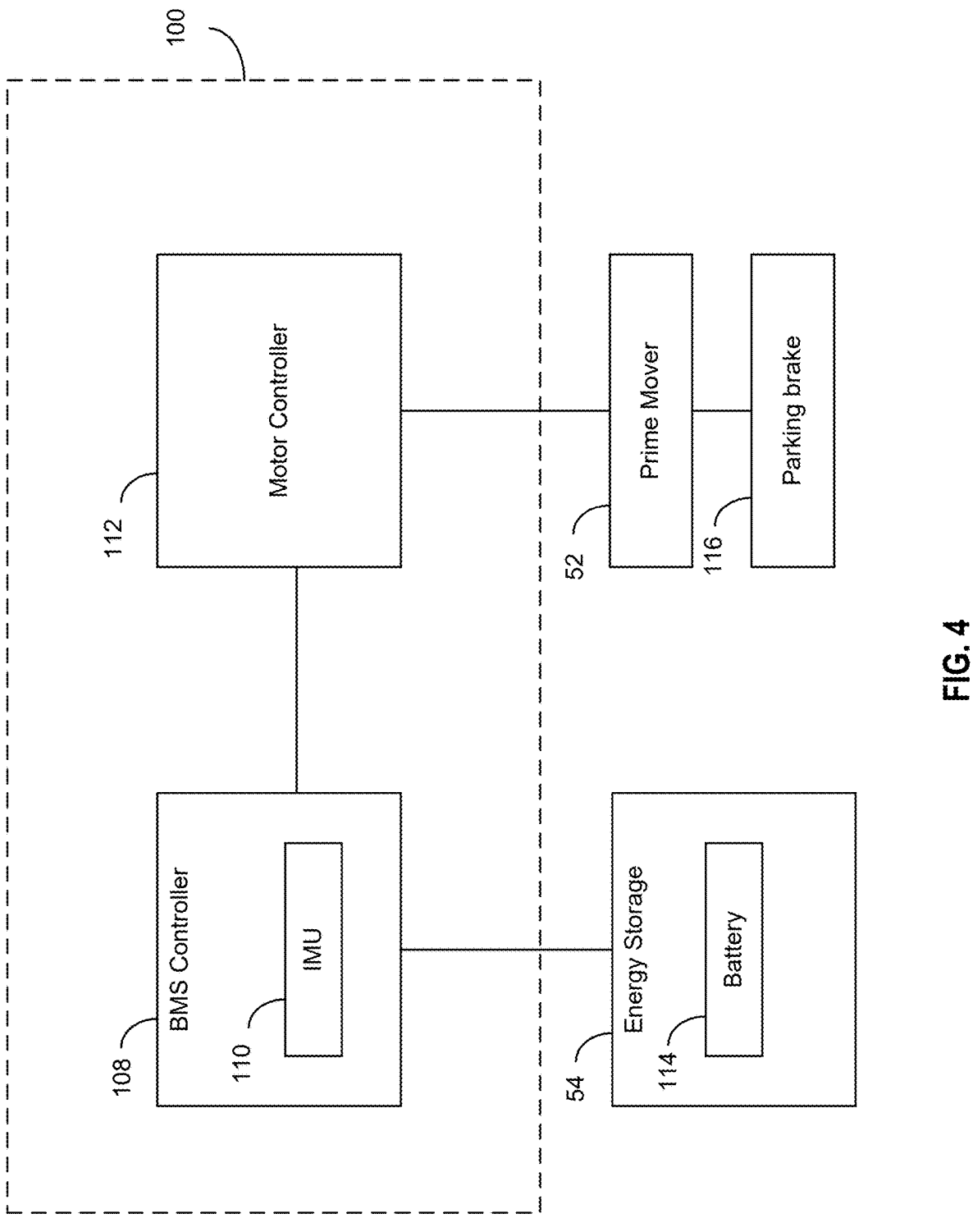
FIG. 4 is a block diagram of a vehicle control system of the vehicle of FIG. 1, according to an exemplary embodiment.

Referring to FIG. 4, a more detailed block diagram of the vehicle control system 100 is shown, according to exemplary embodiments. As shown in FIG. 4, the vehicle control system 100 includes (a) a first controller or battery management system (BMS), shown as BMS controller 108, having an internal IMU, shown as IMU 110, and (b) a second controller, shown as motor controller 112. In other embodiments, the IMU 110 is separate from the BMS controller 108 (e.g., a separate component, part of the motor controller 112, etc.). The BMS controller 108 and/or the motor controller 112 may include a processing circuit, a memory, and a communications interface similar to the processing circuit 102, the memory 104, and communications interface 106.

As shown in FIG. 4, (a) the BMS controller 108 is coupled with a battery pack or bank, shown as battery 114, of the energy storage 54, (b) the motor controller 112 is coupled with the prime mover 52 and an electronic braking mechanism thereof, shown as parking brake 116, and (c) the BMS controller 108 and motor controller 112 are coupled with one another. In some embodiments, the BMS controller 108 and/or IMU 110 are disposed within a housing of the energy storage 54 holding the battery 114 (e.g., inside of the housing of a battery pack). In this way, the BMS controller 108 and the IMU 110 may be a part of the energy storage 54 and be powered by direct connection to the battery 114. In other embodiments, the IMU 110 is located in or mounted on an external device (e.g., on the chassis or frame 12, inside the dashboard, on suspension components, etc.). In this example, the IMU 110 may be powered by an auxiliary power feed. The auxiliary power feed may be an individual battery pack, a wired connection to the vehicle's electrical system, a solar panel, or anything of the like. According to an exemplary embodiment, the IMU 110 includes accelerometers, gyroscopes, and/or magnetometers to facilitate detecting movement, vibrations, acceleration, tilt, and/or rotational motion of the vehicle 10. In some embodiments, the IMU 110 is coupled with an onboard camera. In an exemplary embodiment, the data collected by the IMU 110 and/or an onboard camera is utilized by the vehicle control system 100 to determine when an occupant has entered the vehicle 10 and/or whether a person is otherwise manipulating or interacting with the vehicle 10.

Figure 5:
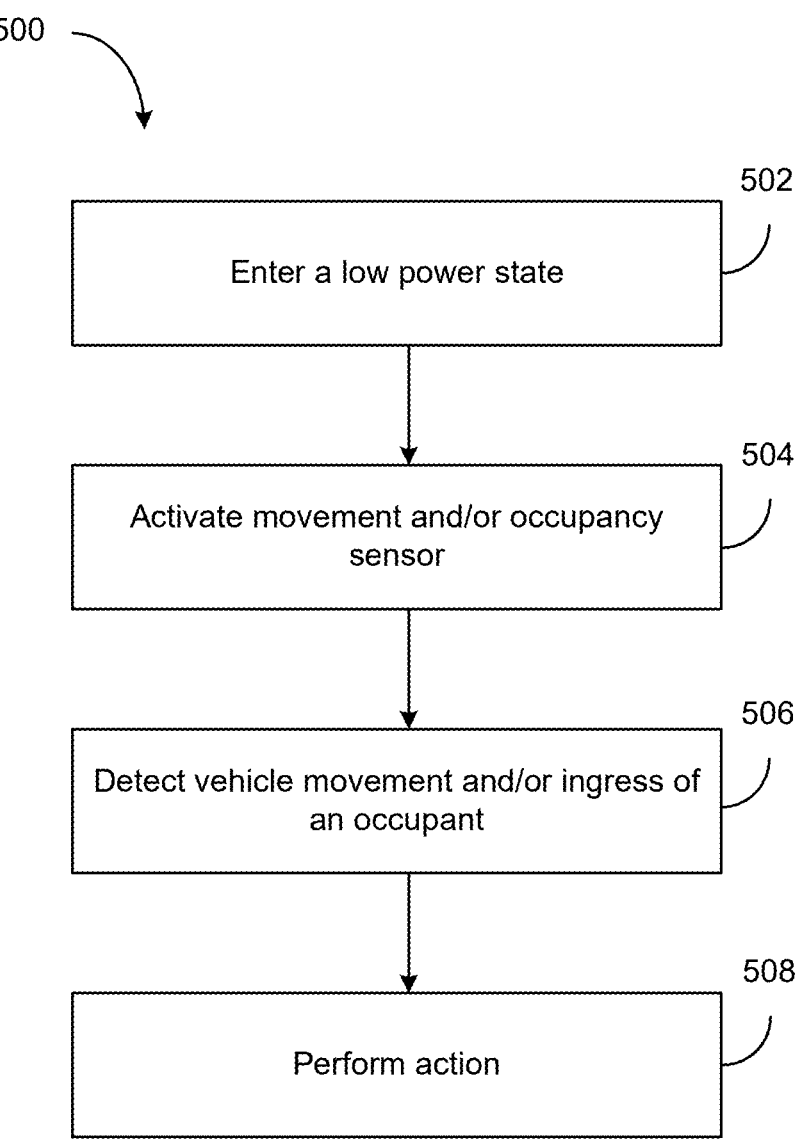
FIG. 5 is a flow chart of a process for detecting vehicle movement or ingress of an occupant and performing a responsive action, according to an exemplary embodiment.

Referring to FIG. 5, a flow chart of a process 500 (e.g., performed by the vehicle control system 100, the BMS controller 108, the motor controller 112, etc.) for detecting movement of the vehicle 10 or ingress of an occupant into the vehicle 10, waking the vehicle 10 from a low power state, and performing a responsive action is shown, according to an exemplary embodiment. The vehicle 10 may be powered on or powered off. With power on, the vehicle 10 may initialize and engage the vehicle control system 100, the BMS controller 108, the IMU 110, the motor controller 112, the battery 114, the prime mover 52, the parking brake 116, and the other systems shown in FIG. 2.

At step 502, when the vehicle 10 is powered off (e.g., by turning a key in the ignition, by pressing a power-off button, after sitting stationary for a period of time, etc.), the vehicle 10 enters a low power state. At step 504, in the low power state, (a) the BMS controller 108 and the IMU 110 thereof and/or (b) one or more of the sensors 90 remain powered by the battery 114 and active, whereas the remaining electrical components (e.g., the prime mover 52, the motor controller 112, the operator interface 48, etc.) of the vehicle 10 may be powered down or off. The IMU 110 may be referred to herein or be utilized to function as a "movement sensor" and/or an "occupancy sensor." The one or more sensors 90 may include a sensor that is or functions as an "occupancy sensor." By way of example, the occupancy sensor may include a proximity sensor, a motion sensor, a seat switch, a floor switch, a weight sensor, a camera, and/or any other sensor capable of detecting ingress of an occupant into the vehicle 10.

Figure 7:
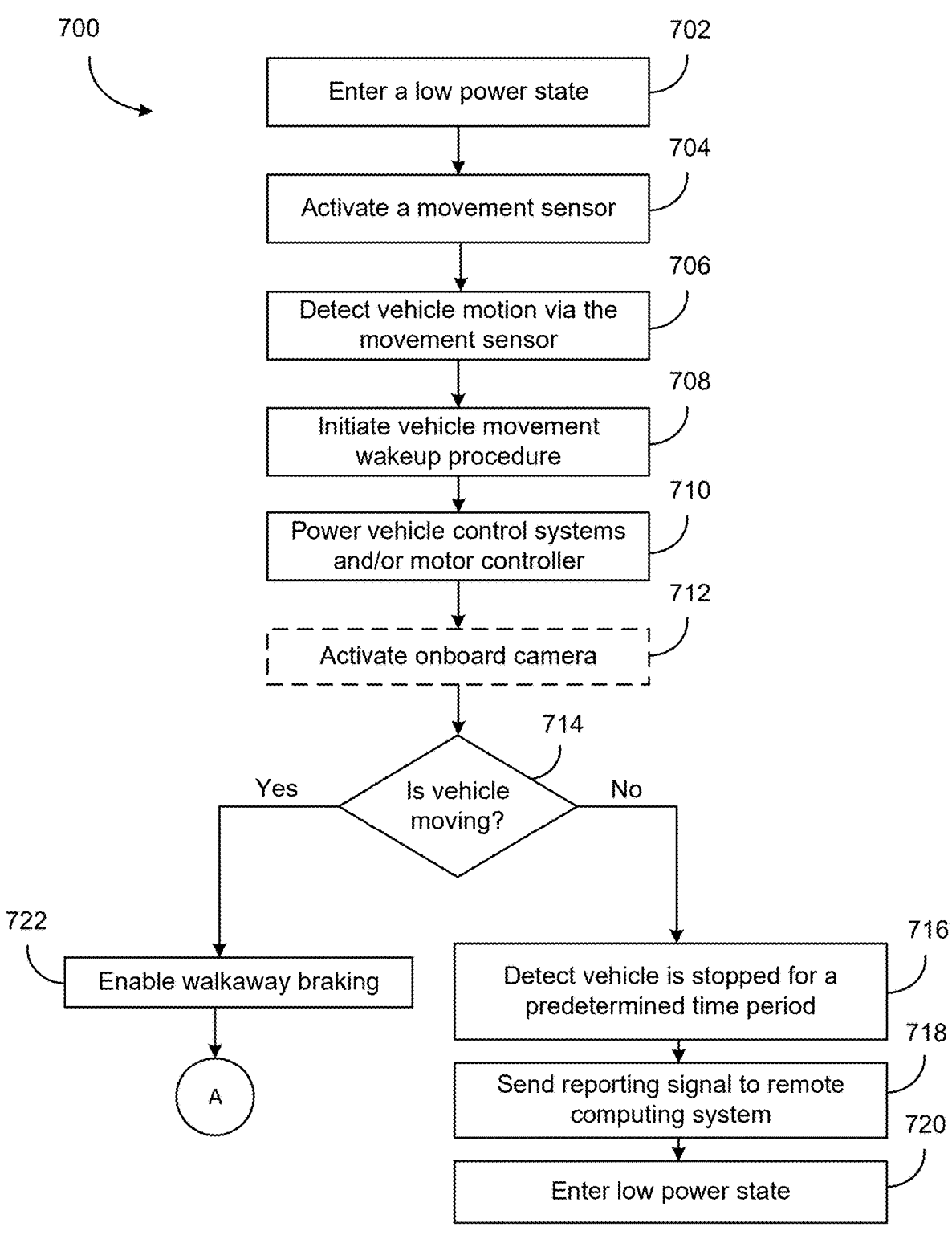
FIGS. 7 and 8 are flow charts of a braking process implemented after detecting vehicle movement, according to exemplary embodiments.
Figure 8:
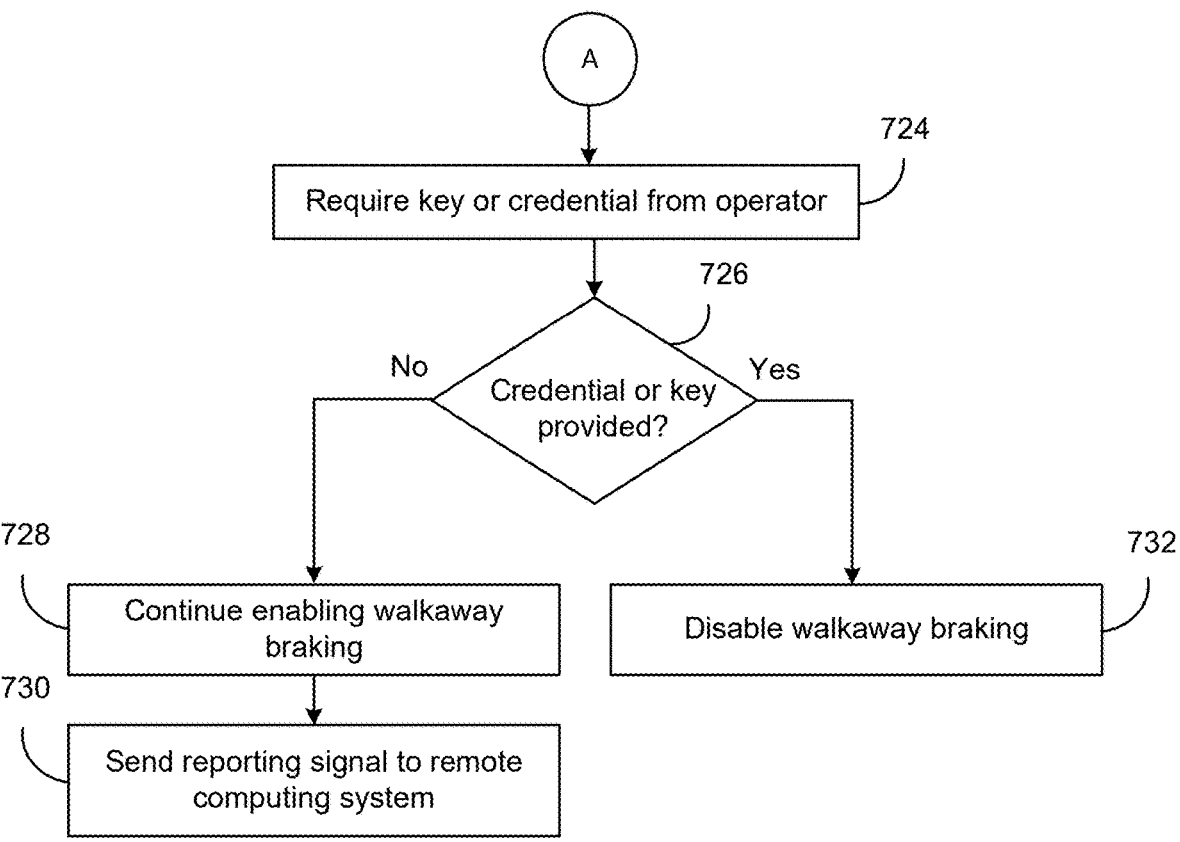

At step 506, the movement sensor and/or the occupancy sensor are configured to acquire data during the low power state that facilitates detecting that the vehicle 10 is moving (e.g., vibrating, rocking, rolling, tilting, etc.) and/or an occupant has entered the vehicle 10. At step 508, in response to detecting motion and/or occupant ingress, the movement sensor and/or the occupancy sensor transmits a signal to the BMS controller 108 to perform an action. As explained in greater detail herein with respect to FIGS. 6-8, the action may be or include initiating power activation of one or more vehicle components (e.g., the prime mover 52, the operator interface 48, the sensors 90, the motor controller 112, etc.), operating the parking brake 116, operating the electric motor (e.g., the prime mover 52) to perform regenerative braking, transmitting signals to the remote systems 240, and/or powering the operator interface 48 to display a graphical user interface ("GUI"), among other possible actions that would require the vehicle 10 to not be operating in the low powered state. Further, while FIG. 6 and FIGS. 7 and 8 are shown as separate processes, it should be understood that the processes of FIG. 6 and FIGS. 7 and 8 may be implemented together such that occupant ingress detection and vehicle movement detection may be performed simultaneously on the vehicle 10.

Occupant Ingress Detection

Figure 6:
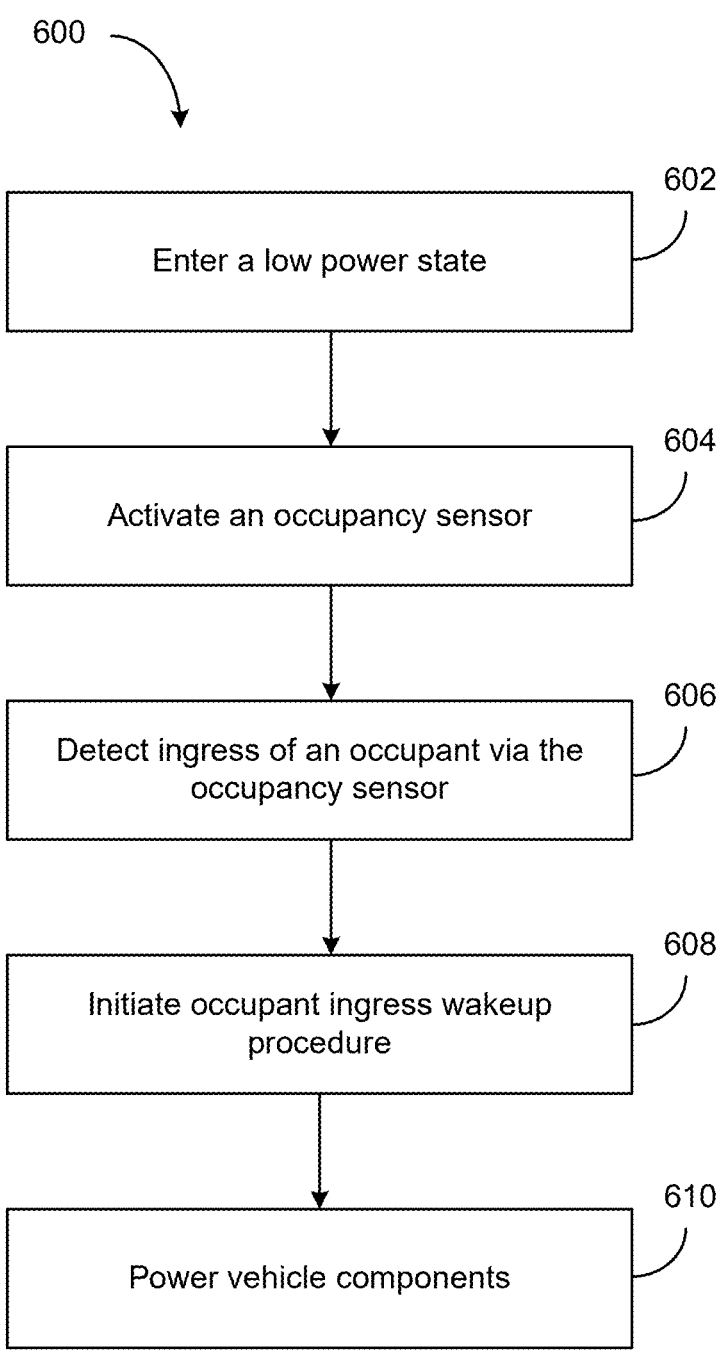
FIG. 6 is a flow chart of an occupant ingress detection process, according to exemplary embodiments.

Referring now to FIG. 6, a flow chart of a process 600 for occupant ingress detection is shown, according to an exemplary embodiment. Steps 602-606 are similar to steps 502-506 and such description similarly applies to steps 602-606. At step 602, when the vehicle 10 is powered off (e.g., by turning a key in the ignition, by pressing a power-off button, after sitting stationary for a period of time, key not being present, etc.), the vehicle 10 enters a low power state. At step 604, in the low power state, the occupancy sensor remains active or is activated during the lower power state.

At step 606, the occupancy sensor is configured to acquire data during the low power state that facilitates detecting that an occupant has entered the vehicle 10. By way of example, the IMU 110 (e.g., accelerometers, gyroscopes, magnetometers, etc. thereof) may sense movement of the vehicle 10 indicative of an occupant entering or occupant ingress into the vehicle 10 (e.g., axial changes or shifting, jostling of the vehicle 10 that occurs when an occupant enters the vehicle 10, etc.). By way of another example, the sensors 90 include a motion sensor, a proximity sensor, a camera, a microphone or an occupancy sensor that detects the presence of the occupant entering and/or sitting in the vehicle 10. By way of another example, a switch or weight sensor may detect an occupant stepping onto a floor board of the vehicle 10 and/or sitting on the front row seating 32 of the vehicle 10. In some embodiments, the IMU 110 and one or more of the sensors 90 are used in combination to detect occupant ingress and occupancy.

At step 608, in response to detecting occupant ingress, the occupancy sensor transmits a signal (e.g., a first signal, an ingress signal, etc.) to the BMS controller 108 and the BMS controller 108 is configured to initiate an occupant ingress wakeup procedure such that the vehicle 10 exits the low power state. At step 610, initiating the occupant ingress wakeup procedure includes the BMS controller 108 operating the battery 114 to provide electrical power to the electrical systems and components of the vehicle 10 (e.g., the prime mover 52, the motor controller 112, the parking brake 116, the operator interface 48, the sensors 90, etc.). Such occupant ingress wakeup procedure causes the vehicle 10 to be ready to be operated and driven more quickly without requiring manual operator wakeup of the electrical systems and components vehicle 10. In this way, the initialization process begins in response to an occupant's ingress to the vehicle 10, before and without requiring the occupant to present a key, push a button, or operates a switch to turn the vehicle 10 on, providing a more seamless operator experience. Though, in some embodiments, the operator may be required to insert a physical key, have the physical key present on their person, and/or a enter a PIN/credential before the vehicle 10 can be driven (e.g., to prevent unauthorized operation of the vehicle 10).

In some embodiments, responsive to receiving a signal from the occupancy sensor, the BMS controller initiates a timer. The vehicle control system 100 is configured to re-enter the low power state in response to the timer indicating that a predetermined time period has elapsed without further action in or operation of the vehicle 10. For example, if an occupant enters the vehicle 10, but does not take action (e.g., turn the key, operate pedals, etc.), the BMS controller 108 may cause the vehicle 10 to re-enter the low power state after a period of time (e.g., 1 minute, 2 minutes, 5 minutes, etc.). In this way, power consumption is limited in the event of a false trigger.

Vehicle Movement Detection

Referring now to FIGS. 7 and 8, a flow chart of a process 700 for vehicle movement detection is shown, according to an exemplary embodiment. Steps 702-706 are similar to steps 502-506 and such description similarly applies to steps 702-706. At step 702, when the vehicle 10 is powered off (e.g., by turning a key in the ignition, by pressing a power-off button, after sitting stationary for a period of time, key not being present, etc.), the vehicle 10 enters a low power state. At step 704, in the low power state, the movement sensor remains active or is activated during the lower power state.

At step 706, the movement sensor is configured to acquire data during the low power state that facilitates detecting movement of the vehicle 10 (e.g., separate or different from occupant ingress conditions). By way of example, the IMU 110 (e.g., accelerometers, gyroscopes, magnetometers, etc. thereof) may sense movement of the vehicle 10 indicative of the vehicle 10 rolling or sliding (e.g., towed, pushed, pulled, consistent slow motion with a more substantial duration such as 10 second, 30 seconds, 1 minute, etc.), being hit or run into (e.g., axial changes or shifting, jostling of the vehicle 10 that occurs as a result of an impact, sudden movement with short duration such as 1 second, 2 seconds, etc. may indicate that the vehicle 10 was hit by another vehicle or external object, etc.), etc. For example, the vehicle 10 may be parked on a hill or incline and the weight thereon and/or the angle of the hill/incline may cause the vehicle 10 to inadvertently start to roll down the hill/incline. As another example, the vehicle 10 may be parked on a hill or incline, and then a load may be applied thereto (e.g., in a bed thereof, in a rear portion thereof, etc.). Such increased loading may cause the vehicle 10 to start rolling down the hill/incline. As yet another example, the vehicle 10 may be towed, pulled, or pushed by a person without the vehicle 10 being turned on.

At step 708, in response to detecting vehicle movement, the movement sensor transmits a signal (e.g., a second signal, a movement signal, etc.) to the BMS controller 108 and the BMS controller 108 is configured to initiate a vehicle movement wakeup procedure. At step 710, initiating the vehicle movement wakeup procedure includes the BMS controller 108 operating the battery 114 to provide electrical power to other components of the vehicle control system 100, which may include an overall vehicle controller (e.g., the processing circuit 102) and/or the motor controller 112. Initiating the vehicle movement wakeup procedure may also include operating the battery 114 to provide electrical power to the other electrical systems. For example, one or more of the sensors 90 (e.g., a camera) may initialized and brought online. In some embodiment, at step 712, the BMS controller 108 is configured to transmit power from the battery 114 to an onboard camera responsive to receiving the signal. The onboard camera may be operated by the vehicle control system 100 to begin collecting visual and/or audial data regarding activity around the vehicle 10 responsive to receiving the signal.

At step 714, the vehicle control system 100 is configured to determine whether the vehicle 10 is still moving (as detected by the movement sensor and independently or separate from the movement sensor). By way of example, the motor controller 112 may be configured to determine whether the prime mover 52 is active (e.g., an output shaft thereof rotating) in response to the rear tractive assembly 56 and/or the front tractive assembly 58 of the vehicle 10 rolling. By way of another example, the vehicle control system 100 may be configured to monitor the GPS position of the vehicle 10 and determine whether the vehicle 10 is moving. By way of yet another example, the vehicle control system 100 may be configured to monitor the visual and/or audial data from the onboard camera to determine whether the vehicle 10 is moving.

At step 716, the vehicle control system 100 is configured to determine that the vehicle 10 is no longer moving in response to detecting that the vehicle 10 has remained stationary for a predetermined period of time (e.g., 15 seconds, 30 seconds, 1 minute, 2 minutes, etc.) after the initial movement detected by the movement sensor (e.g., indicative of an impact to the vehicle 10 rather than the vehicle 10 rolling or being towed, pushed, or pulled). The vehicle control system 100 may have a timer that is configured to monitor an amount of time elapsed since the movement sensor has detected motion. At step 718, the vehicle control system 100 is configured to send a first reporting signal (e.g., a collision reporting signal, an accident reporting signal, etc.) to a remote computing system (e.g., the remote system 240, the off-site server 250, the on-site system 260, a fleet manager, etc.). By way of example, the vehicle control system 100 may notify the remote computing system of the type of movement (an impact or collision in this instance) based on the data collected by the movement sensor, the onboard camera, and other sensors 90. The vehicle controller system 100 may include additional information with the first reporting signal such as a vehicle identifier, a time of the movement event, a date of the movement event, and/or a location of the movement event. The remote computing system may be configured to notify a fleet manager or owner associated with the vehicle 10 and present the event information thereto (e.g., to entice inspection of the vehicle 10, to confirm the movement event diagnosis, etc.). At step 720, the vehicle control system 100 is configured to re-enter the low power state in response to the timer indicating that the predetermined time period has elapsed and after the reporting signal having been sent.

If the vehicle control system 100 determines that the vehicle 10 is still moving (e.g., indicative of the vehicle 10 rolling or being towed, pushed, or pulled; the vehicle 10 not remaining stationary for the predetermined period of time after the initial detection of movement; etc.), then, at step 722, the vehicle control system 100 (e.g., the motor controller 112) is configured to enable walkaway braking. Walkaway braking may include engaging one or more braking mechanisms and/or enabling one or more braking functions. For example, step 722 may include transmitting a signal to the parking brake 116. Additionally or alternatively, step 722 may include operating the prime mover 52 (i.e., the electric motor) to perform regenerative braking to slow or stop the movement vehicle 10 (e.g., whether the movement is inadvertent or intentional). For example, responsive to the vehicle control system 100 determining that the vehicle 10 is still moving, the motor controller 112 may cause the electric motor to operate as a generator. When operating as a generator, the electric motor converts the kinetic energy produced by the wheels/drive shaft of the vehicle 10 when the vehicle is rolling, being towed, pushed or pulled into electricity. The electrical current generated by the motor in this conversion opposes the rotation of the drive shaft, thereby creating a braking force that resists the motion of the vehicle 10. In some embodiments, the vehicle control system 100 (e.g., the motor controller 112) may operate additional mechanical braking mechanisms responsive to determining that the vehicle 10 is still moving.

At step 724, the vehicle control system 100 is configured to provide a notification (e.g., on the operator interface 48, via a speaker of the vehicle 10, etc.) requesting that a vehicle key be inserted into the ignition or a credential be provided (e.g., a PIN, a password, a biometric, etc.). At step 726, the vehicle control system 100 is configured to determine whether a key or a credential has been provided, and whether such key or credential is valid. At step 728, the vehicle control system 100 is configured to continue enabling walkaway braking. This may include continuing to engage braking mechanism(s) (e.g., the parking brake 116) and/or continuing to enable braking function(s) (e.g., regenerative braking by the electric motor) if the key or the credential is not provided, or the key or the credential is incorrect. At step 730, simultaneously or nearly simultaneously, the vehicle control system 100 is configured to send a second reporting signal (e.g., a rolling signal, a tow signal, an anti-theft signal, etc.) to the remote computing system. The vehicle controller system 100 may include additional information with the second reporting signal such as a vehicle identifier, a time of the movement event, a date of the movement event, and/or a location of the movement event. In some embodiments, the vehicle control system 100 is configured to activate an alarm of the vehicle 10 in response to an incorrect credential being entered or provided by the operator (e.g., more than three times). Responsive to the correct credential being entered or provided, at step 732, the vehicle controller system 100 (e.g., the motor controller 112) is configured to disable walkaway braking. In some embodiments, step 732 includes disengaging the parking brake 116. Additionally or alternatively, step 732 may include disabling regenerative braking to permit continued movement of the vehicle 10. Regenerative braking may be disabled by powering the electric motor off or by changing the operative mode of the electric motor from a generator mode to a prime mover mode. Such automatic braking may not only prevent unintentional movement of the vehicle 10 when on inclines and/or under loading, but also provide an anti-theft braking function. By way of example, in some instances, a parking brake of some vehicles may be able to be externally powered while a vehicle is off, allowing someone to disengage the parking brake and push or tow such vehicle. However, the vehicle 10 of the present disclosure would sense such an event and perform one or more braking functions (e.g., reengage the parking brake 116, engage in regenerative braking, etc.) until the proper key or credentials are provided.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and descriptions may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the site monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A golf cart operable in a low power state, the golf cart comprising:
   an electric motor configured to perform a braking function;
   a battery;
   a sensor; and
   a control system including a first controller and a second controller;
   wherein:
      the first controller and the sensor are powered by the battery without the second controller and the electric motor being powered during the low power state;
      the sensor is configured to facilitate detecting movement of the golf cart during the low power state;
      the first controller is configured to:
         receive a signal from the sensor indicating that the golf cart has moved during the low power state; and
         exit the low power state by causing power from the battery to be provided to the second controller in response to receiving the signal; and
      the second controller is configured to:
         separately evaluate the movement of the golf cart independent from the sensor;
         enable the braking function in response to determining that the golf cart is moving; and
         re-enter the low power state in response to determining that the golf cart is not moving.

2. The golf cart of claim 1, wherein the sensor is an inertial measurement unit.

3. The golf cart of claim 1, wherein the first controller is a battery management system.

4. The golf cart of claim 3, wherein the sensor is an inertial measurement unit that is integrated with the battery management system.

5. The golf cart of claim 1, wherein the control system is configured to provide a notification that at least one of a physical key or a credential is necessary to disable the braking function.

6. The golf cart of claim 5, wherein the control system is configured to disable or permit disablement of the braking function in response to at least one of (a) the physical key being inserted into an ignition, (b) the physical key being within a certain proximity of the golf cart, or (c) the credential being entered.

7. The golf cart of claim 5, further comprising a user interface, wherein the control system is configured to receive the credential via the user interface.

8. The golf cart of claim 7, wherein the control system is configured to operate an alarm system in response to receiving an invalid credential via the user interface.

9. The golf cart of claim 1, further comprising an onboard camera configured to acquire at least one of visual data or audial data in response to the sensor detecting movement during the low power state.

10. The golf cart of claim 9, wherein the control system is configured to send the at least one of the visual data or the audial data collected to a remote system.

11. The golf cart of claim 1, wherein the control system is configured to send a reporting signal to a remote system in response to at least the sensor detecting the movement during the low power state.

12. A vehicle operable in a low power state, the vehicle comprising:
   an electric motor configured to perform a braking function;
   a control system including a motor controller and a battery management system having an integrated inertial measurement unit;
   a user interface; and
   a battery;
   wherein:
      the battery management system and the integrated inertial measurement unit are powered by the battery without the motor controller and the electric motor being powered during a low power state;
      the integrated inertial measurement unit is configured to facilitate detecting movement of the vehicle during the low power state;
      the battery management system is configured to:
         receive a signal from the integrated inertial measurement unit indicating that the vehicle has moved during the low power state; and
         exit the low power state by causing power from the battery to be provided to the motor controller in response to receiving the signal; and
      the motor controller is configured to:
         separately evaluate the movement of the vehicle;
         re-enter the low power state in response to determining that the vehicle is not moving;
         enable the braking function in response to determining that the vehicle is moving; and
         operate the user interface to display a graphical user interface requesting that at least one (a) a physical key for the vehicle be inserted into an ignition, (b) the physical key be brought within a certain proximity of the vehicle, or (c) a credential be provided.

13. The vehicle of claim 12, wherein the control system is configured to receive the credential via the user interface.

14. The vehicle of claim 13, wherein the control system is configured to operate an alarm system in response to receiving an invalid credential via the user interface.

15. The vehicle of claim 12, further comprising an onboard camera configured to acquire at least one of visual data or audial data in response to the inertial measurement unit detecting movement during the low power state.

16. The vehicle of claim 15, wherein the control system is configured to send the at least one of the visual data or the audial data collected to a remote system.

17. The vehicle of claim 12, wherein the control system is configured to send a reporting signal to a remote system in response to at least the inertial measurement unit detecting the movement during the low power state.

18. A method comprising:

providing a vehicle including an electric motor configured to perform a braking function, a battery, a sensor, and a control system including a first controller and a second controller;

operating the battery in a low power state, which includes providing power to the first controller and the sensor without providing power to the second controller and the electric motor;

receiving, by the first controller, a signal from the sensor indicating that the vehicle has moved during the low power state;

exiting the low power state by causing, by the first controller, power from the battery to be provided to the second controller in response to receiving the signal;

separately evaluating, by the second controller, the movement of the vehicle;

enabling, by the second controller, the braking function in response to determining that the vehicle is moving; and re-entering the low power state in response to the second controller determining that the vehicle is not moving.

19. The method of claim 18, further comprising:

providing, by the control system, a notification that at least one of a physical key or a credential is necessary to disable the braking function; and disabling, by the control system, the braking function in response to at least one of (a) the physical key being inserted into an ignition, (b) the physical key being within a certain proximity of the vehicle, or (c) the credential being entered.

20. The method of claim 18, further comprising sending, by the control system, a reporting signal to a remote system in response to at least the sensor detecting the movement during the low power state.

* * * * *